US008625566B1

(12) United States Patent
Husted et al.

(10) Patent No.: US 8,625,566 B1
(45) Date of Patent: Jan. 7, 2014

(54) DETECTION OF TRANSMISSION IN COLLOCATED WIRELESS DEVICES

(75) Inventors: Paul J. Husted, San Jose, CA (US); Olaf Hirsch, Sunnyvale, CA (US); MeeLan Lee, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 875 days.

(21) Appl. No.: 12/644,682

(22) Filed: Dec. 22, 2009

(51) Int. Cl.
*H04B 1/38* (2006.01)

(52) U.S. Cl.
USPC .......................................... 370/339; 455/572

(58) Field of Classification Search
None
See application file for complete search history.

(56) References Cited

U.S. PATENT DOCUMENTS

| 7,183,844 | B2* | 2/2007 | Klomsdorf et al. ........... 330/129 |
| 7,317,921 | B2* | 1/2008 | Mueckenheim et al. ... 455/452.1 |
| 7,372,866 | B2* | 5/2008 | Jang et al. .................... 370/437 |
| 7,844,222 | B2* | 11/2010 | Grushkevich ............... 455/41.2 |
| 7,844,234 | B2* | 11/2010 | Walia et al. ................ 455/127.1 |
| 8,160,089 | B1* | 4/2012 | Padiyar et al. ............... 370/445 |
| 2006/0227852 | A1* | 10/2006 | Black et al. .................... 375/133 |
| 2008/0144493 | A1* | 6/2008 | Yeh .............................. 370/230 |
| 2009/0170453 | A1* | 7/2009 | Walia et al. ................ 455/127.1 |
| 2011/0007675 | A1* | 1/2011 | Chiou et al. ................. 370/297 |
| 2011/0092164 | A1* | 4/2011 | Spanhake ................. 455/67.11 |
| 2011/0124364 | A1* | 5/2011 | Donovan et al. ............. 455/522 |
| 2012/0093037 | A1* | 4/2012 | Thubert et al. ............... 370/255 |

OTHER PUBLICATIONS

U.S. Appl. No. 12/399,350, Husted, Paul J.
U.S. Appl. No. 12/541,284, Husted, Paul J.

* cited by examiner

*Primary Examiner* — Hassan Kizou
*Assistant Examiner* — Roberta A Shand
(74) *Attorney, Agent, or Firm* — DeLizio Gilliam, PLLC

(57) ABSTRACT

Interference between wireless devices communicating in close proximity to each other can result in performance degradation. Although the wireless devices may exchange information to schedule their communications, in some instances, a first wireless device may not notify the second wireless device before initiating a transmission. In addition to interference, components of the second wireless device may be damaged. Functionality can be implemented on the second wireless device to detect transmissions in the first wireless device and accordingly suspend communications of the second wireless device. This can help mitigate interference between the first and second wireless devices and prevent component damage of the second wireless device.

33 Claims, 9 Drawing Sheets

DETECTION OF TRANSMISSION IN COLLOCATED WIRELESS DEVICES

BACKGROUND

Embodiments of the inventive subject matter generally relate to the field of wireless communications and, more particularly, to detecting transmission in collocated wireless devices.

When wireless devices are in close proximity to each other, communication from one wireless device may interfere with communication from the other wireless device. For example, when Bluetooth® and wireless local area network (WLAN) devices operate in close proximity to each other, the radio protocol of one device can interfere with the radio protocol of the other device. Packet traffic arbitration (PTA) may be used to exchange dynamic information between the wireless devices to prevent the wireless devices from transmitting at the same time.

SUMMARY

Various embodiments are disclosed of a mechanism for detecting transmission in collocated wireless devices. In one embodiment, a method comprises monitoring a power supply line associated with a first wireless network device of a communication system. An indication of an increase in power drawn by the first wireless network device is detected. It is determined that the first wireless network device will transmit a packet based on detecting the indication of the increase in power drawn by the first wireless network device. Communications of a second wireless network device of the communication system are suspended in response to said determining that the first wireless network device will transmit the packet.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
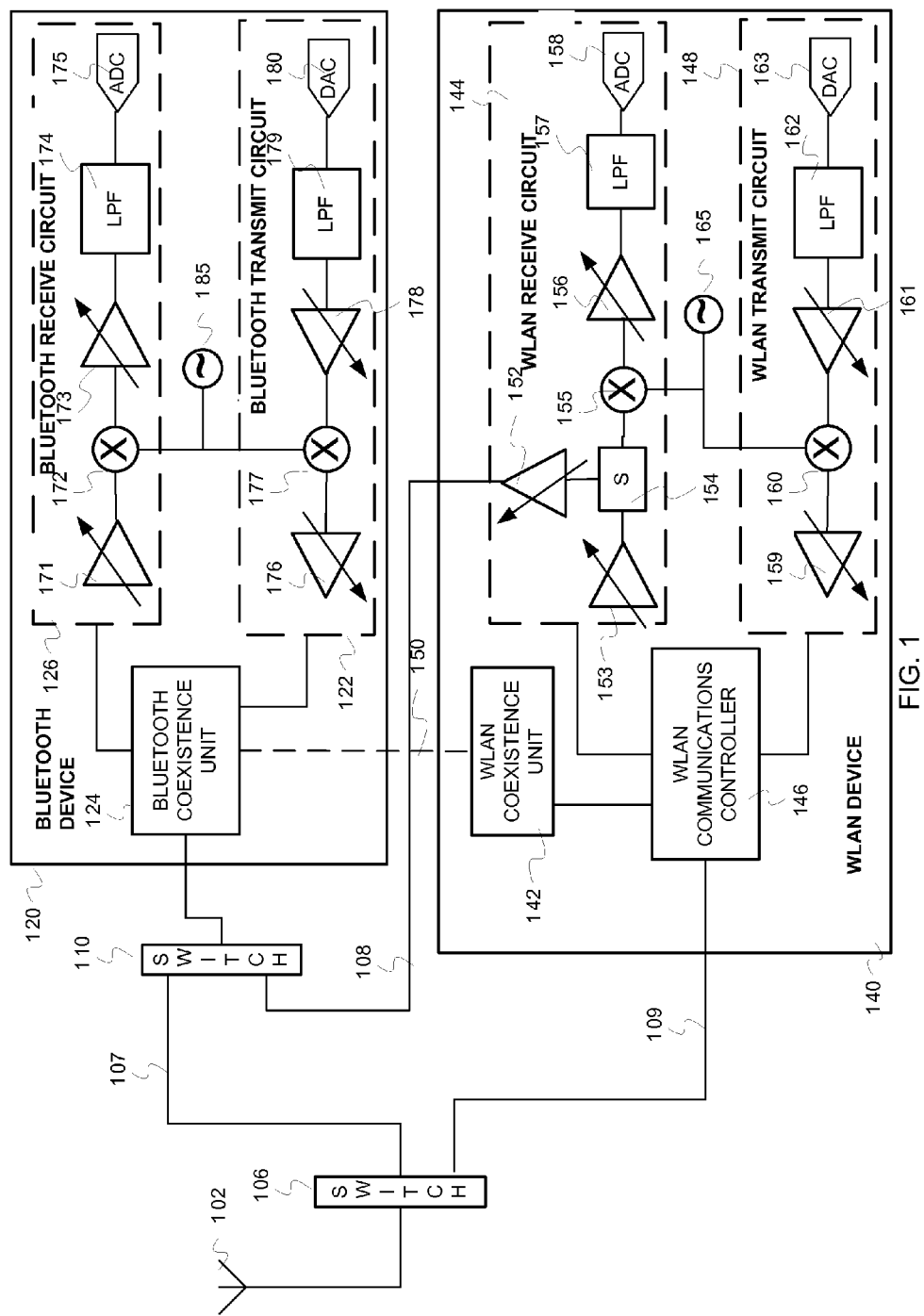
FIG. 1 is a circuit diagram illustrating example architecture of a collocated Bluetooth device and a WLAN device.

The description that follows includes exemplary systems, circuits, methods, techniques, instruction sequences, and computer program products that embody techniques of the present inventive subject matter. However, it is understood that the described embodiments may be practiced without these specific details. For instance, although examples refer to detecting transmission to enable coexistence between WLAN and Bluetooth devices, in other embodiments transmission may be detected in other wireless standards and devices, e.g., WiMAX, ZigBee®, Wireless USB devices, etc. In other instances, well-known instruction instances, protocols, structures, and techniques have not been shown in detail in order not to obfuscate the description.

Interference between two wireless network devices (e.g., a Bluetooth device and a WLAN device) collocated on a common system and communicating within a common frequency spectrum (e.g., a 2.4 GHz spectrum) can result in performance degradation. Typically, the wireless network devices exchange information to schedule transmission/reception of packets. However, in some implementations, one of the wireless network devices may not notify the other wireless network device before initiating a packet transmission. For example, the Bluetooth device may receive an inquiry frame or a page frame while the Bluetooth device and the WLAN device are in a shared receive mode. According to Bluetooth protocols, in some instances, the Bluetooth device may be required to switch to a transmit mode and transmit a response to the inquiry/page frame. Existing coexistence solutions may not provide a mechanism for the Bluetooth device to provide an indication to the WLAN device, or the WLAN device to detect, that the Bluetooth device will perform a transmit operation in response to the inquiry/page frame. In other words, because the WLAN device is unaware of the Bluetooth device switching from the receive mode into the transmit mode and transmitting the response, collisions between a Bluetooth transmit packet and a WLAN receive packet can occur resulting in loss of information. Also, in some instances, the high power of the Bluetooth transmit signal may damage components of the WLAN device, e.g., when the Bluetooth and WLAN devices are in a shared receive mode.

Functionality can be implemented for a collocated first wireless network device to detect transmissions in a collocated second wireless network device. In one embodiment, a power supply line of the second wireless network device can be monitored to detect an increase in power drawn by the second wireless network device, which can serve as an indication of transmission in the second wireless network device. In another embodiment, signal strength at an I/O pin of the second wireless network device can be compared with reference signal strength to determine whether the second wireless network device will transmit while the first wireless network device is in the receive mode. Additional techniques can be implemented for detecting transmission in the second wireless network device, as will be further described below with reference to FIGS. 1-8. By detecting transmission in the second wireless network device, ongoing communications of the first wireless network device can be suspended (e.g., disabling a low noise amplifier (LNA), disabling the receive mode, etc.) without exchange of information between the two collocated wireless network devices. Moreover, loss of information and component damage in the first wireless network device can also be mitigated.

FIG. 1 is a circuit diagram illustrating example architecture of a collocated Bluetooth device and a WLAN device. FIG. 1 depicts the Bluetooth device 120 and the WLAN device 140. In some embodiments, the Bluetooth device 120 and the WLAN device 140 may be collocated on a common system (e.g., on the same circuit board, on distinct circuit boards within the same system, etc.). In other embodiments, the Bluetooth device 120 and the WLAN device 140 can be embedded on the same chip (e.g., a system on a chip (SoC), an integrated circuit, etc.) The Bluetooth device 120 comprises a Bluetooth coexistence unit 124, a Bluetooth receive circuit 126, and a Bluetooth transmit circuit 122. The Bluetooth coexistence unit 124 is coupled to the Bluetooth receive circuit 126 and the Bluetooth transmit circuit 122. In one example, the Bluetooth receive circuit 126 comprises an LNA 171, a mixer 172, an amplifier 173, a low pass filter 174, and an analog to digital converter (ADC) 175. The Bluetooth receive circuit 126 may also comprise additional components (e.g., amplifiers, filters, decoding units, etc.) for processing a Bluetooth receive packet. In one example, the Bluetooth transmit circuit 122 comprises a power amplifier 176, a mixer 177, an amplifier 178, a low pass filter 179, and a digital to analog converter (DAC) 180. The Bluetooth transmit circuit 122 may also comprise additional processing units (e.g., modulators, encoders, etc.) coupled to the DAC 180 to generate and process a Bluetooth transmit packet before the Bluetooth transmit packet is transmitted. The Bluetooth device 120 also comprises a Bluetooth synthesizer 185, which is provided as input to the mixers 172 and 177. The Bluetooth coexistence unit 124 may comprise a switch (not shown) to switch between the Bluetooth receive circuit 126 and the Bluetooth transmit circuit 122. It is noted, however, that in some examples the switch may be separate from the Bluetooth coexistence unit 124. The Bluetooth coexistence unit 124 may provide the Bluetooth receive packet to the low noise amplifier 171 in the Bluetooth receive circuit 126 when the Bluetooth device 120 is in "receive mode". The Bluetooth coexistence unit 124 may receive the Bluetooth transmit packet from the power amplifier 176 in the Bluetooth transmit circuit 122 when the Bluetooth device 120 is in "transmit mode".

The WLAN device 140 comprises a WLAN coexistence unit 142, a WLAN receive circuit 144, a WLAN transmit circuit 148, and a WLAN communications controller 146. The WLAN coexistence unit 142 is coupled to the WLAN communications controller 146 and the Bluetooth coexistence unit 124. The WLAN communications controller 146 is coupled to the WLAN receive circuit 144 and the WLAN transmit circuit 148. In one example, the WLAN receive circuit 144 comprises an LNA 153, a splitter 154, a mixer 155, an amplifier 156, a low pass filter 157, and an ADC 158. The splitter 154 is also connected to an LNA output driver 152. The WLAN receive circuit 144 can comprise additional components (e.g., amplifiers, filters, decoding units, etc.) for processing a WLAN receive packet. In one example, the WLAN transmit circuit 148 comprises a power amplifier 159, a mixer 160, an amplifier 161, a low pass filter 162, and a DAC 163. The WLAN transmit circuit 148 may comprise additional processing units (e.g., modulators, encoders, etc.) coupled to the DAC 163 to generate and process a WLAN transmit packet before the WLAN transmit packet is transmitted. The WLAN device 140 also comprises a WLAN synthesizer 165, which is provided as input to the mixers 155 and 160. The WLAN communications controller 146 may comprise a switch (not shown) to switch between the WLAN receive circuit 144 and the WLAN transmit circuit 148. It is noted, however, that in some examples the switch may be separate from the WLAN communications controller 146. The WLAN communications controller 146 may provide the WLAN receive packet to the low noise amplifier 153 in the WLAN receive circuit 144 when the WLAN device 140 is in "receive mode". The WLAN communications controller 146 may receive the WLAN transmit packet from the power amplifier 159 of the WLAN transmit circuit 148 when the WLAN device 140 is in "transmit mode". In some implementations, the WLAN communications controller 146 can control the switch to switch between the WLAN transmit circuit 148 and the WLAN receive circuit 144 based on an indication from the WLAN coexistence unit 142, the WLAN receive circuit 144, the WLAN transmit circuit 148, and/or the Bluetooth coexistence unit 124.

FIG. 1 also depicts a communication antenna 102 coupled with a switch 106. The switch 106 has a first connection 107 with switch 110 and a second connection 109 with the WLAN communications controller 146. The switch 110 is coupled to the Bluetooth coexistence unit 124. The switch 110 has the first connection 107 with the switch 106 and a second connection 108 with the LNA output driver 152. In one example, the switches 106, 110 and the WLAN communications controller 146 may be configured to give control of the communication antenna 102 to one of the WLAN receive circuit 144, the WLAN transmit circuit 148, and the Bluetooth device 120. Within the Bluetooth device 120, in one example, the Bluetooth coexistence unit 124 can control whether the Bluetooth transmit circuit 122 or the Bluetooth receive circuit 126 should gain control of the communication antenna 102.

In some embodiments, the communication antenna 102 can be used for transmissions and receptions, and the switches 106 and 110 may be bidirectional switches. When the WLAN device 140 is in an inactive state and only the Bluetooth device 120 is communicating (e.g., transmitting Bluetooth packets, receiving Bluetooth packets, scanning for other Bluetooth devices, etc.), the communication antenna 102 is coupled with the Bluetooth device 120 via the switch 106, the connection 107, and the switch 110. When the Bluetooth device 120 is in an inactive state and only the WLAN device 140 is communicating (e.g., transmitting WLAN packets, receiving WLAN packets, etc.), the communication antenna 102 is coupled with the WLAN device 140 via the switch 106 and the connection 109.

In some implementations, the circuit of FIG. 1 can enable the Bluetooth device 120 and the WLAN device to operate in shared receive mode (e.g., involving simultaneous reception of Bluetooth and WLAN signals). In one example, when the Bluetooth device 120 and the WLAN device 140 are in the shared receive mode, the received RF signal is provided from the communication antenna 102 to the WLAN receive circuit 144 via the switch 106, the connection 109, and the WLAN communications controller 146. In the WLAN receive circuit 144, the received RF signal is amplified by the LNA 153 and is then provided to the splitter 154. In one example, the splitter 154 can split the received RF signal energy into two parts—one portion of the received RF signal energy is provided to the remainder of the WLAN receive circuit 144 for further processing by the mixer 155, the amplifier 156, the LPF 157, the ADC 158, etc. The other portion of the received RF signal energy is provided to the Bluetooth receive circuit 126 via the LNA output driver 152, the connection 108, the switch 110, and the Bluetooth coexistence unit 124. The LNA output driver 152 may amplify the Bluetooth portion of the received RF signal energy before providing the signal to the switch 110. The Bluetooth receive circuit 126 may then accordingly process the Bluetooth portion of the received RF signal energy.

As described above, in some instances, the Bluetooth device 120 may switch from a receive mode to a transmit mode without notifying the WLAN device 140, e.g., to transmit a response to the inquiry/page frame. In these instances, if the system is in the shared receive mode, when the Bluetooth device 120 switches from the receive mode to the transmit mode, the Bluetooth device 120 transmits a high-power Bluetooth transmit signal to the LNA output driver 152 along the established signal path between the Bluetooth device 120 and the WLAN device 140 via the LNA output driver 152. Because the LNA output driver 152 is typically not designed to withstand the high power of the Bluetooth transmit signal, the LNA output driver 152 and other components of the WLAN device 140 may be damaged.

In one implementation, the WLAN communications controller 146 suspends WLAN communications in accordance with directions from the WLAN coexistence unit 142. The WLAN coexistence unit 142 communicates with the Bluetooth coexistence unit 124 to exchange information (e.g., scheduling information, priority information, etc) about various coexistence events (e.g., Bluetooth packet transmission/reception, WLAN packet transmission/reception, etc.). For example, the Bluetooth coexistence unit 124 may transmit an indication 150 to the WLAN coexistence unit 142 notifying the WLAN coexistence unit 142 that the Bluetooth device 120 will transmit a Bluetooth packet. The indication 150 may be in the form of a signal along a dedicated line, a coexistence message, etc. In response to receiving the indication 150, the WLAN coexistence unit 142 may direct the WLAN communication controller 146 to suspend ongoing WLAN communications. The WLAN communication controller 146 may prevent WLAN packet reception to protect the WLAN device 140 from the high-power Bluetooth transmit signal, e.g., when the system is in a shared receive mode. In some implementations, the WLAN communication controller 146 may allow WLAN packet reception if the WLAN signal is sufficiently large. It is noted, however, that in some two-chip architectures, where the WLAN device 140 and the Bluetooth device 120 are implemented on separate chips (e.g., system on a chip (SoC), integrated circuit, etc.), and may also be from different manufacturers, a dedicated line between the WLAN device 140 and the Bluetooth device 120 may not be practical or possible. Therefore, various other techniques can be implemented for detecting transmission in collocated network devices, e.g., as will be further described below with reference to FIGS. 2-8.

It should be noted that the circuit diagram of FIG. 1 is an example, and should not be used to limit the embodiments. For example, in some implementations, the Bluetooth coexistence unit 124 might transmit the indication 150 to the WLAN communications controller 146. The WLAN communications controller 146 may accordingly suspend WLAN communications in response to receiving the indication 150. Although the circuit diagram of FIG. 1 depicts component connections to illustrate the Bluetooth device 120 and the WLAN device 140 operating in the 2.4 GHz spectrum, in some implementations, the WLAN device 140 may also operate in the 5 GHz spectrum. For example, the WLAN device 140 that implements IEEE 802.11a/b/g protocols, may operate in the 2.4 GHz (for 802.11b/g communications) and the 5 GHz (for 802.11a communications) spectrum. In some implementations, the system of FIG. 1 may comprise additional components to process signals in the 5 GHz spectrum, e.g., the WLAN device 140 may comprise additional components, such as a distinct transmit/receive circuit for processing signals in the 5 GHz spectrum, etc. for processing the 5 GHz WLAN signals.

Figure 2:
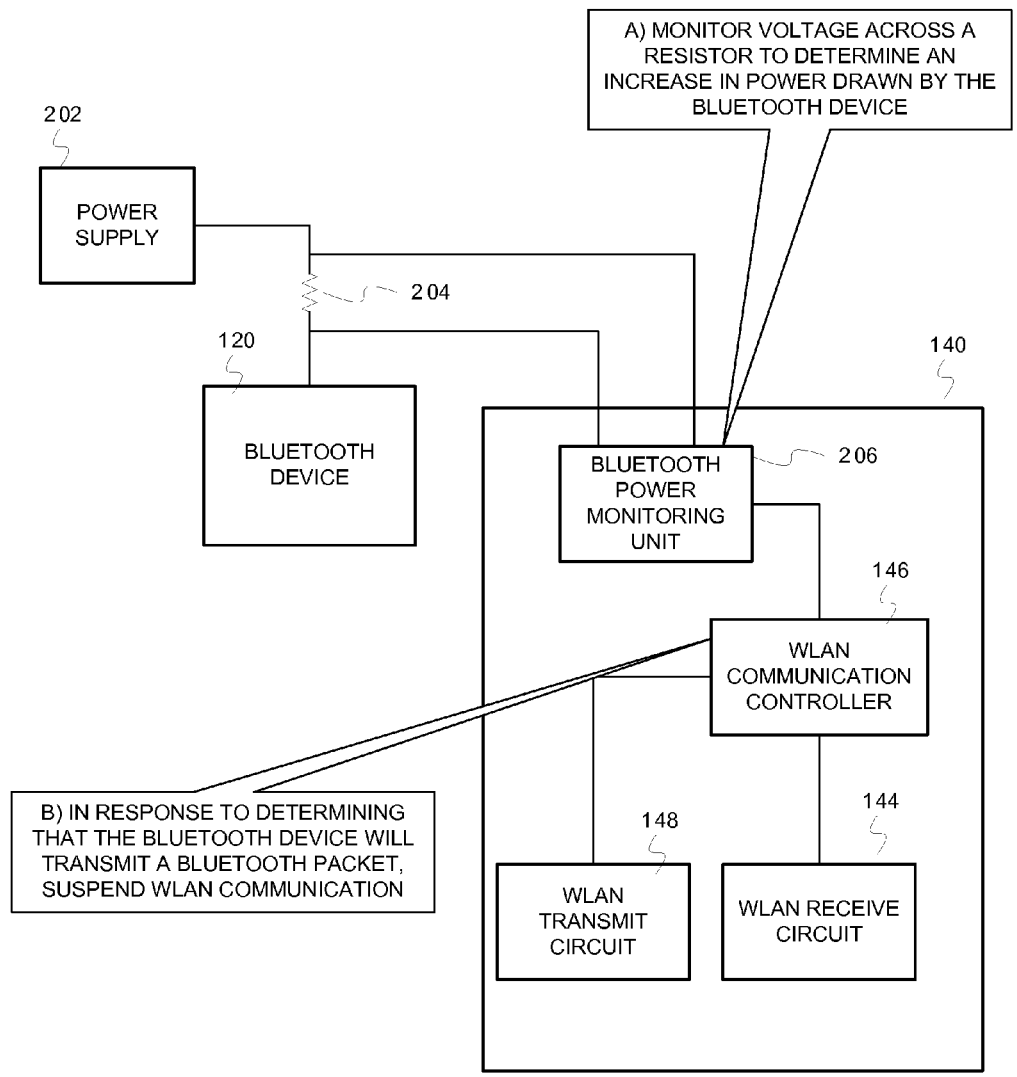
FIG. 2 is an example conceptual diagram illustrating operations for detecting Bluetooth packet transmission based on monitoring a power supply for a Bluetooth device.

FIG. 2 is an example conceptual diagram illustrating operations for detecting Bluetooth packet transmission based on monitoring a power supply for a Bluetooth device. FIG. 2 depicts the WLAN device 140 comprising a Bluetooth power monitoring unit 206, the WLAN communications controller 146, the WLAN transmit circuit 148, and the WLAN receive circuit 144. The WLAN communications controller 146 is coupled to the WLAN transmit circuit 148 and the WLAN receive circuit 144. The WLAN communications controller 146 is also connected to the Bluetooth power monitoring unit 206. FIG. 2 also depicts the Bluetooth device 120 connected to a power supply 202. The power supply 202 can be configured to drive the Bluetooth device 120. In some implementations, the power monitoring unit 206 can monitor a Bluetooth power supply line connected to the power supply 202 to detect an increase in power which may be indicative of a Bluetooth transmission. For example, a resistor 204 can be connected in series between the power supply 202 and the Bluetooth device 120, and the power monitoring unit 206 can monitor the voltage across the resistor 204, as will be described further below. In one example, the resistor 204 maybe connected in series with a power amplifier supply line (e.g., a power supply that provides voltage to the power amplifier 176 of the Bluetooth device 120) after an RF choke.

At stage A, the Bluetooth power monitoring unit 206 monitors a voltage across the resistor 204 to determine an increase in power drawn by the Bluetooth device 120. In one implementation, the Bluetooth power monitoring unit 206 may comprise a low frequency ADC (LFADC) which can be used to monitor the voltage across the resistor 204. As the power drawn by the power amplifier 176 increases, the current through the resistor 204 increases, resulting in an increase in the voltage across the resistor 204. The Bluetooth power monitoring unit 206 detects the increase in the voltage across the resistor 204 and notifies the WLAN communications controller 146. In some implementations, the Bluetooth power monitoring unit 206 may comprise a comparator (not shown) and may compare the voltage across the resistor 204 with a threshold voltage. The Bluetooth power monitoring unit 206 may notify the WLAN communications controller 146 when the voltage across the resistor 204 exceeds the threshold voltage. In another implementation, the Bluetooth power monitoring unit 206 may notify the WLAN communications controller 146 on detecting an increase in the voltage across the resistor 204 when compared to a previous value of the voltage across the resistor 204.

At stage B, the WLAN communications controller 146 suspends communications of the WLAN device 140. The WLAN communications controller 146 may use the notification of the increase in power drawn by the power amplifier 176 as an indication that the Bluetooth device 120 will transmit a Bluetooth packet. The WLAN communications controller 146 can direct the WLAN receive circuit 144 to abort ongoing WLAN packet receptions. The WLAN communications controller 146 may also disable (e.g., turn off) an LNA output driver (e.g., the LNA output driver 152 of FIG. 1) so that the WLAN device 140 is not coupled with the Bluetooth device 120. This can ensure that the LNA output driver 152 does not provide a Bluetooth portion of the received RF signal energy to the Bluetooth device and that the WLAN receive circuit 144 is not damaged by the high-power Bluetooth transmit signal. In some implementations, the WLAN communications controller 148 may direct the WLAN transmit circuit 148 to suspend ongoing WLAN packet transmissions so as to avoid collision with the Bluetooth packet transmissions.

Figure 3:
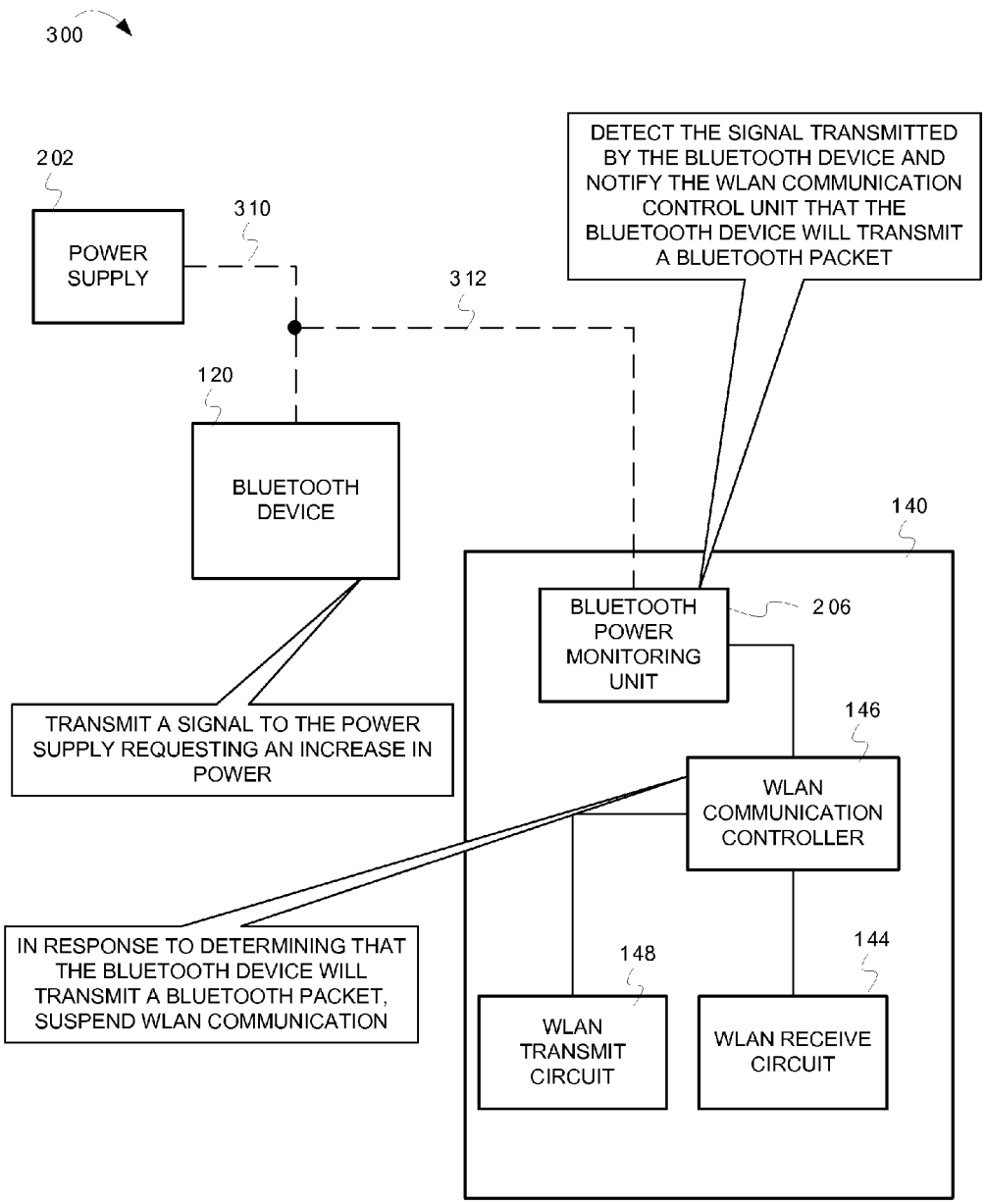
FIG. 3 is an example conceptual diagram illustrating an alternate embodiment for detecting Bluetooth packet transmission based on monitoring a power supply for a Bluetooth device.

FIG. 3 is an example conceptual diagram illustrating an alternate embodiment for detecting Bluetooth packet transmission based on monitoring a power supply for a Bluetooth device. FIG. 3 depicts the power supply 202 connected to the Bluetooth device 120 via a signaling line depicted by dashed line 310. The Bluetooth device 120 transmits a signal to the power supply 202 to request an increase in power. In some implementations, the Bluetooth device 120 may transmit the signal to a power management unit (not shown) that controls various power supplies of the system. The Bluetooth device 120 may transmit the signal requesting power for a power amplifier supply line before the power amplifier 176 of FIG. 1 begins drawing the higher power.

The Bluetooth power monitoring unit 206 monitors the signaling line 310 to detect the request for power to the power amplifier 176. The Bluetooth power monitoring unit 206 may tap into the signaling line 310. This is represented by a dashed line 312 between the signaling line 310 and the Bluetooth power monitoring unit 206. The Bluetooth power monitoring unit 206 may notify the WLAN communications controller 146 on detecting the signal transmitted by the Bluetooth device 120 to the power supply 202. In response to receiving the notification from the Bluetooth power monitoring unit 206, the WLAN communications controller 146 can direct the WLAN transmit circuit 148 or the WLAN receive circuit 144 to abort ongoing communications. As described above, the WLAN communication controller 146 can also disable the LNA output driver 152 of FIG. 1 to isolate the WLAN receive circuit 144 from the Bluetooth transmit circuit 122.

Figure 4:
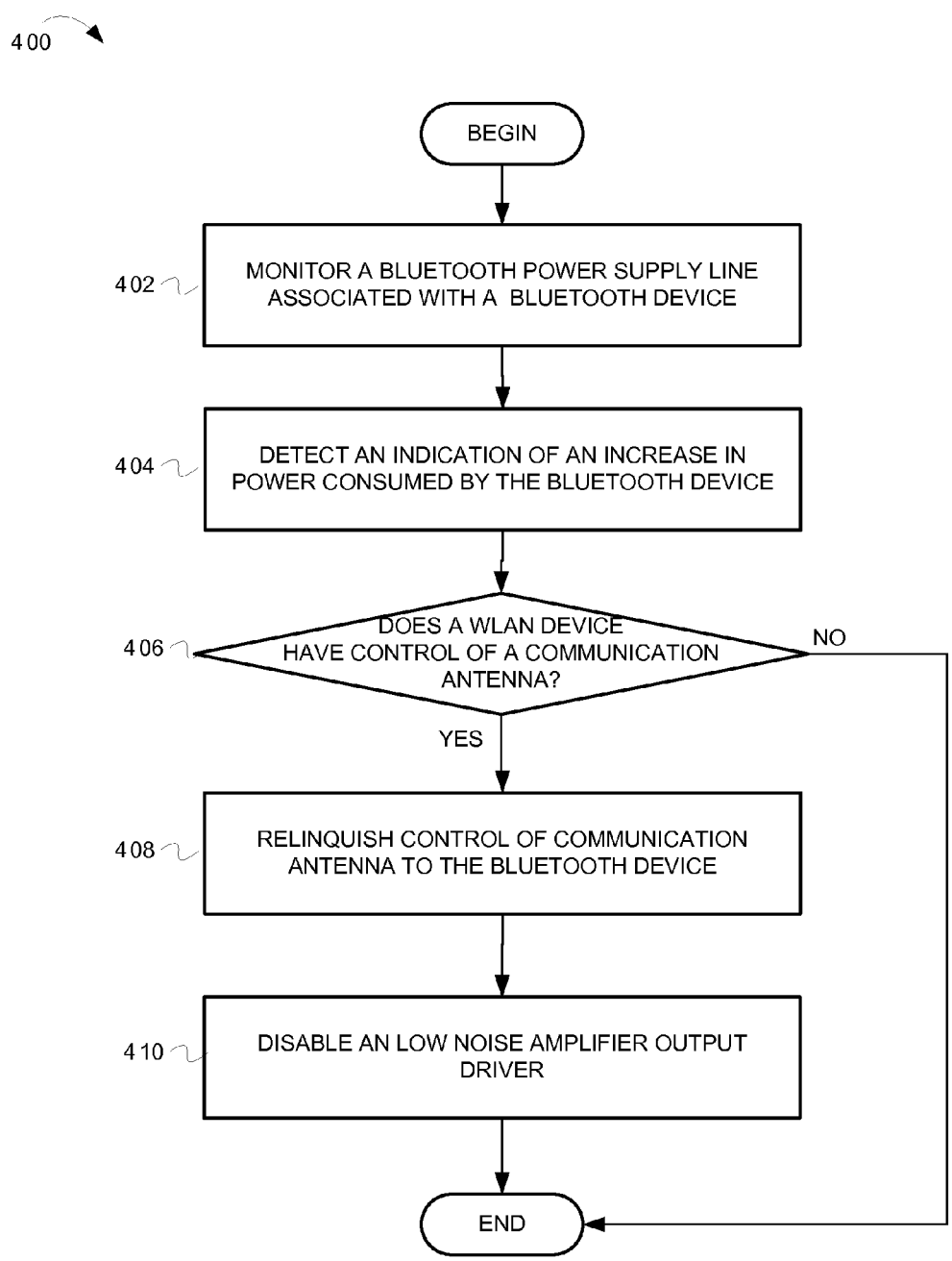
FIG. 4 is a flow diagram illustrating example operations for detecting transmission in a Bluetooth device based on monitoring a power supply line for a Bluetooth device.

FIG. 4 is a flow diagram illustrating example operations for detecting transmission in a Bluetooth device based on monitoring a power supply line of the Bluetooth device. Flow 400 begins at block 402.

At block 402, the power supply line, of the Bluetooth device, is monitored. For example, the Bluetooth power monitoring unit 206 of FIG. 2 may monitor the power supply 202 associated with the Bluetooth device 120. In one implementation, the Bluetooth power monitoring unit 206 may monitor voltage across a resistor (e.g., the resistor 204) connected in series with the power supply line of the Bluetooth device (e.g., a power amplifier supply line). In another implementation, the Bluetooth power monitoring unit 206 may monitor a signaling line (e.g., the signaling line 310 of FIG. 3) between the Bluetooth device 120 and the power supply 202. The flow continues at block 404.

At block 404, an indication of an increase in power consumed by the Bluetooth device is detected. For example, the Bluetooth power monitoring unit 206 may detect the indication of the increase in power consumed by the Bluetooth device 120. In one implementation, the Bluetooth power monitoring unit 206 detects the increase in power drawn by the Bluetooth device 120 by monitoring the voltage across the resistor 204. The Bluetooth power monitoring unit 206 may generate the indication of the increase in power consumed by the Bluetooth device 120 on detecting the increase in the voltage across the resistor 204. In another implementation, the Bluetooth power monitoring unit 206 may generate the indication of the increase in power consumed by the Bluetooth device 120 on detecting a signal, transmitted by the Bluetooth device 120, requesting power for a Bluetooth device power amplifier. The Bluetooth power monitoring unit 206 may transmit the indication of the increase in power consumed by the Bluetooth device 120 to a WLAN communications controller 146. In another implementation, a Bluetooth coexistence unit 124 of FIG. 1 may receive a notification (e.g., from the power supply) if the power drawn by the power amplifier 176 exceeds a threshold limit and transmit the notification to the WLAN communications controller 146. The flow continues at block 406.

At block 406, it is determined whether the WLAN device has control of a communication antenna. The communication antenna (e.g., the communication antenna 102 of FIG. 1) may be a common antenna used for transmission and reception by both the Bluetooth device 120 and the WLAN device 140. For example, the WLAN communications controller 146 may determine whether the WLAN device 140 is receiving an RF signal and providing a portion of the RF signal energy to the Bluetooth device 120. As another example, the WLAN communications controller 146 may determine whether the WLAN device 140 is transmitting a WLAN packet. If it is determined that the WLAN device has control of the communication antenna, the flow continues at block 408. Otherwise, the flow ends.

At block 408, control of the communication antenna is relinquished to the Bluetooth device. For example, the WLAN communications controller 146 may suspend WLAN communications and relinquish control of the communication antenna 102 to the Bluetooth device 120. The WLAN communication controller 146 may notify the Bluetooth coexistence unit 124 that the WLAN device 140 has relinquished control of the communication antenna 102. The flow continues at block 410.

At block 410, an LNA output driver is disabled. For example, the WLAN communications unit 146 may disable the LNA output driver 152 in the WLAN receive circuit 144. This can ensure that the WLAN receive circuit 144 is not coupled with the Bluetooth device 120. This can ensure that the LNA output driver 152 does not receive the received RF signal and provide a portion of the received RF signal energy to the Bluetooth device 120. Disabling the LNA output driver 152 also ensure that the WLAN receive circuit 144 is not damaged by the high-power Bluetooth transmit signal. From block 410, the flow ends.

Figure 5:
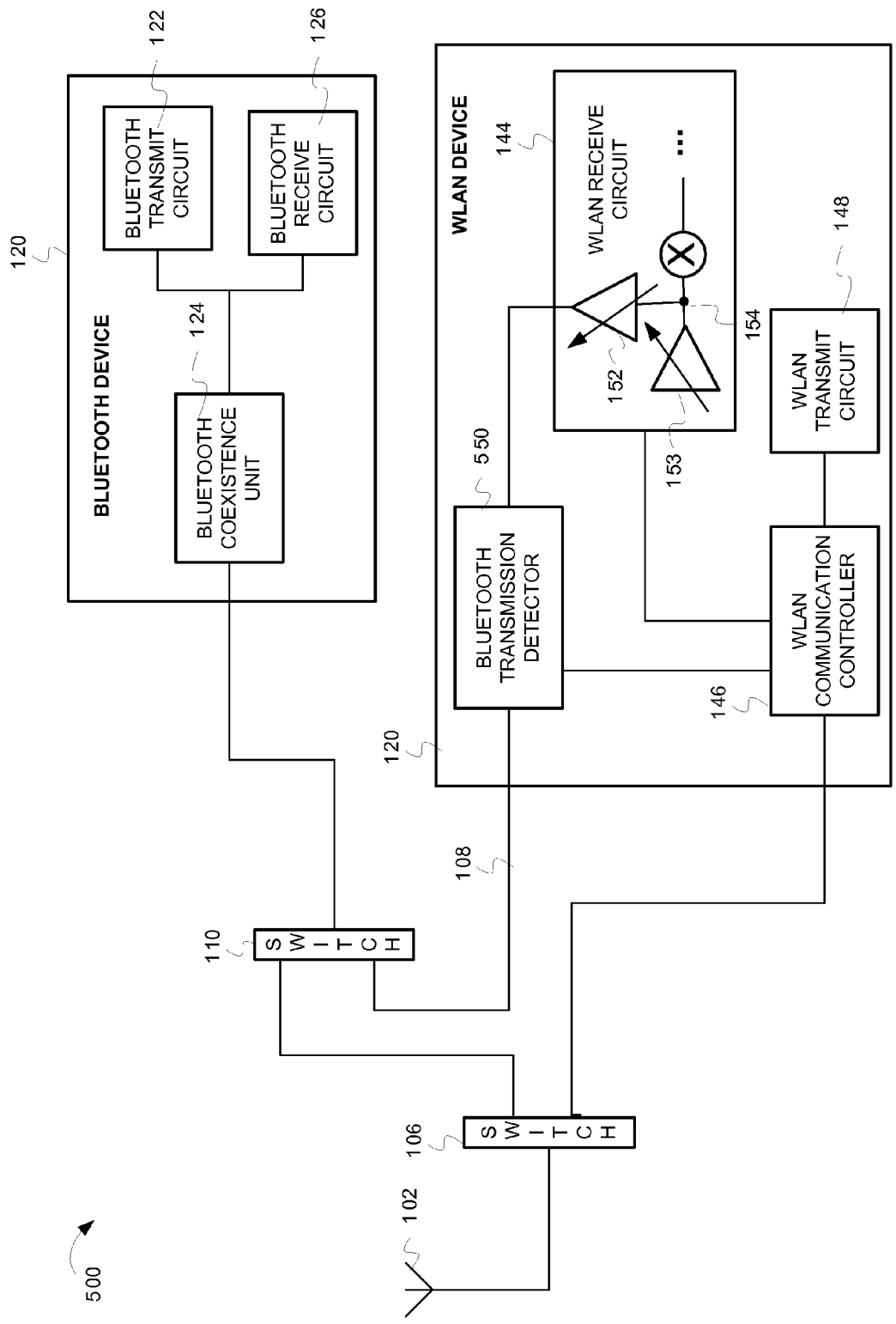
FIG. 5 is an example conceptual diagram illustrating detection of transmission of a Bluetooth device.

FIG. 5 is an example conceptual diagram illustrating detection of transmission in a Bluetooth device. FIG. 5 depicts a Bluetooth transmission detector 550 connected in between the LNA output driver 152 and the switch 110 along the connection 108. As depicted in FIG. 5, the Bluetooth transmission detector 550 is coupled to the WLAN communication controller 146. In some implementations, the Bluetooth transmission detector 550 may detect a Bluetooth packet transmission and accordingly direct the WLAN communications controller 146 to suspend ongoing WLAN communications and disable the LNA output driver 152. In some implementations, the Bluetooth transmission detector 550 may disable the LNA output driver 152.

In one implementation, the Bluetooth transmission detector 550 may comprise a peak detector. The peak detector may be an internal or an external peak detector connected to the output of the LNA output driver 152. The peak detector may have a threshold of −10 dBm, −4 dBm, or any suitable peak detection threshold. The peak detector threshold may be selected such that the peak detector is triggered during a ramp-up stage of the Bluetooth power amplifier 176. For example, the peak detector threshold may be selected to be a level that may be attained mid-way through the ramp-up stage of the power amplifier 176. As another example, the peak detector threshold may be selected to be a level that may be attained after the ramp-up stage of the power amplifier 176 has been completed. Alternately, the peak detector threshold may be selected such that the peak detector is triggered by a signal that is much larger than the signal strength of a typical received RF signal. The peak detector threshold may be selected to be a level much greater than a maximum expected signal strength of the received RF signal. In one implementation, the peak detector threshold may be greater than the maximum expected signal strength of the received RF signal by 40 dBm. For example, if it is determined (e.g., by simulations, analysis of historical data, etc.) that the maximum expected signal strength of the received RF signal is −50 dBm, the peak detector threshold may be −10 dBm.

The signal at an input/output (I/O) terminal of the Bluetooth device 120 may be compared against the peak detector threshold. In the transmit mode, the signal at the I/O terminal of the Bluetooth device 120 may be the high-power Bluetooth transmit signal provided from the Bluetooth transmit circuit 122 to the communication antenna 102. In the receive mode, the signal at the I/O terminal of the Bluetooth device 120 may be a Bluetooth receive signal or a portion of the received RF signal energy (from the LNA output driver 152) provided to the Bluetooth receive circuit 126. Thus, if the signal strength of the signal at an input/output (I/O) terminal of the Bluetooth device 120 is greater than the peak detector threshold, the high signal strength may be attributed to the Bluetooth transmit signal. The peak detector may communicate a result of the comparison to the WLAN communications controller 146. The WLAN communications controller 146 can accordingly disable the LNA output driver 152, thus protecting the LNA output driver 152 and other components of the WLAN device 140 from the high-power Bluetooth transmit signal. Disabling communications of the WLAN device 140 and providing control of the communication antenna 102 to the Bluetooth transmit circuit 122 can also help ensure proper reception of the Bluetooth transmit packet at a receiving Bluetooth device.

Figure 6:
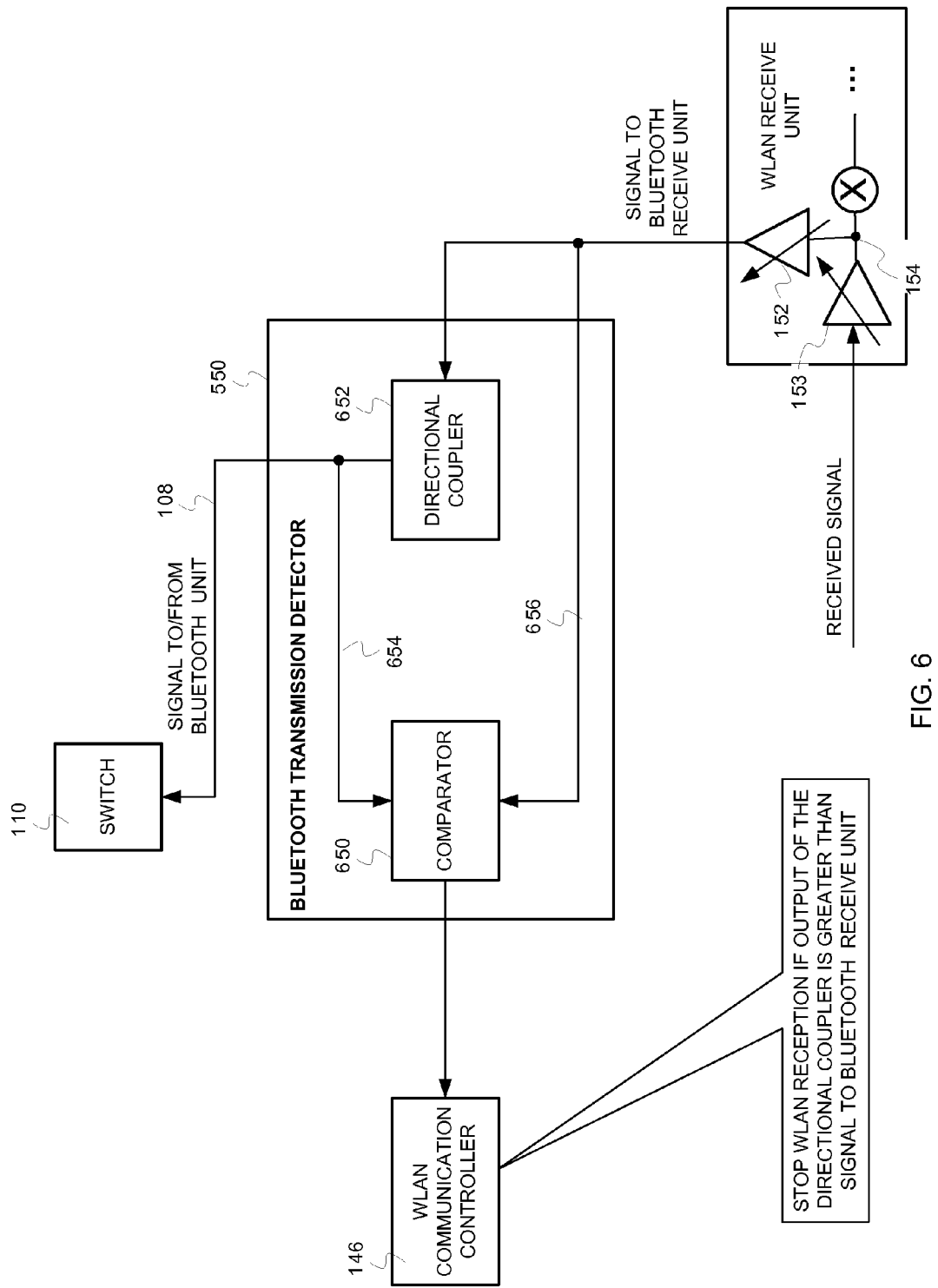
FIG. 6 illustrates one implementation of a Bluetooth transmission detector.

FIG. 6 illustrates another implementation of the Bluetooth transmission detector 550. In FIG. 6, the Bluetooth transmission detector 550 comprises a directional coupler 652 and a comparator 650. In one implementation, the directional coupler 652 is connected between the LNA output driver 152 and the switch 110 (along connection 108). The comparator 650 receives and compares signal strengths at the two ends of the directional coupler 652. Connection 654 represents a signal to/from the Bluetooth device 120. The connection 654 represent a signal transmitted by the Bluetooth device 120 or a signal received by the Bluetooth device 120. The connection 654 can represent the signal at an I/O terminal of the Bluetooth device 120. Connection 656 represents a signal from the LNA output driver 152. As described above, the signal from the LNA output driver 152 is provided to the Bluetooth device 120 for processing by the Bluetooth receive circuit 126.

The directional coupler 652 can be used to infer energy from the LNA output driver 152. The directional coupler 652 is constructed so that the directional coupler 652 provides a greater attenuation for a signal in one direction as compared to in the opposite direction. For instance, the directional coupler 652 may provide a high attenuation in the path from the Bluetooth device 120 to the LNA output driver 146 so that the high-power Bluetooth transmit signal is not transmitted to and does not damage the LNA output driver 152. On the other hand, the directional coupler 652 may provide little or no attenuation in the path from LNA output driver 146 to the Bluetooth device 120 so that the Bluetooth receive unit 126 can receive and process the portion of the received RF signal energy from the LNA output driver 152.

The comparator 650 compares the signal strength of the signal on the connections 656 and 654. In some embodiments, a bias may be applied to the comparator 650 to favor the signal from the LNA output driver and to reduce false detection. If the Bluetooth device 120 is not transmitting a Bluetooth transmit signal, the signal before and after the directional coupler 652 will be approximately equal because the directional coupler 652 provides very little attenuation in the path from the LNA output driver 152 to the Bluetooth device 120. However, if the signal after the directional coupler 652 is much greater than the signal before the directional coupler 652, it may be assumed that the increase in signal strength is as a result of the high-power Bluetooth transmit signal. The result of comparing the signal strengths may be provided to the WLAN communications controller 146. The WLAN communications controller 146 may analyze the output of the comparator 650 and accordingly determine whether or not the Bluetooth device 120 will initiate a Bluetooth packet transmission.

For example, the comparator 650 may generate a "1" (e.g., a high amplitude signal) if the signal received from the Bluetooth device 120 (i.e., the signal strength along the connection 654) is greater than the signal received from the LNA output driver 152 (i.e., the signal strength along the connection 656). The WLAN communications controller 146 can attribute the variation in signal strengths to the high-power Bluetooth transmit signal, disable the LNA output driver 152, and stop reception of the received RF signal. This can ensure that the high-power Bluetooth transmit signal does not damage the LNA output driver 152 and other components of the WLAN receive circuit 144.

On the other hand, the comparator 650 may generate a "0" (e.g., a low amplitude signal) if the signal received along the connection 654 is less than or equal to than the signal received from the LNA output driver 152 (i.e., the signal strength along the connection 656). The signal strengths of the two signal being approximately equal can indicate the output of the LNA output driver 152 is being provided to the Bluetooth receive circuit 126. This also indicates that the Bluetooth device 120 is not transmitting the Bluetooth transmit signal. The WLAN communications controller 146 may not take any action if it is determined that Bluetooth device 120 is not transmitting the Bluetooth transmit signal.

It should be noted that in some implementations, the directional coupler 652 may be replaced by an attenuator. In other words, one input to the comparator 650 may be the signal to/from the Bluetooth device 120 and the other input to the comparator 650 may be the signal transmitted by the Bluetooth device 120 or a signal received by the Bluetooth device 120. The signal provided to/from the Bluetooth device 120 may be attenuated so that the comparator 650 favors the signal from the LNA output driver 152. In other implementations, the attenuator may be used in conjunction with the directional coupler to provide added protection against false detection.

Figure 7:
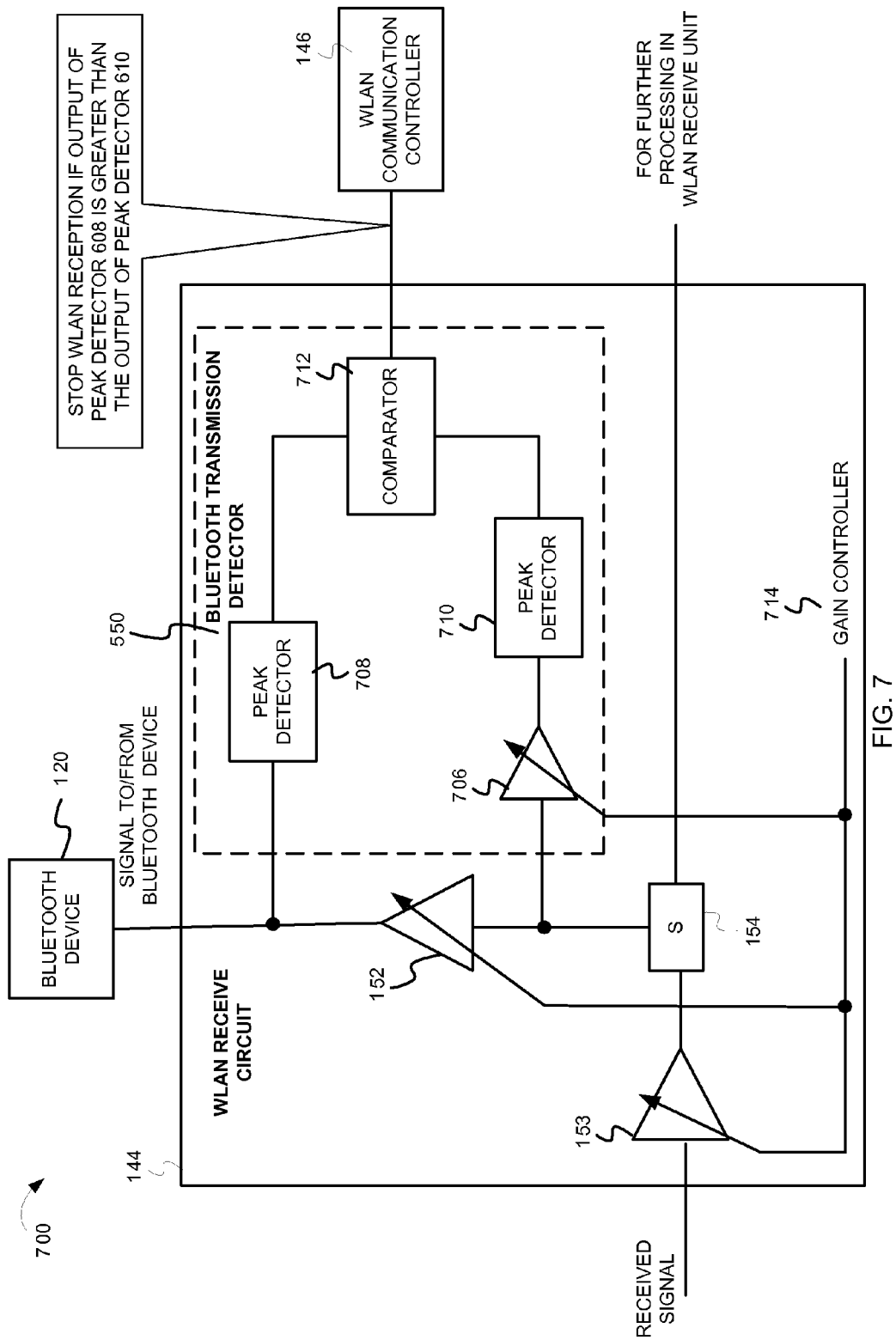
FIG. 7 illustrates an alternate embodiment for detecting transmission in a collocated Bluetooth device.

FIG. 7 illustrates an alternate embodiment for detecting transmission in a collocated Bluetooth device. In FIG. 7, the Bluetooth transmission detector 550 comprises a replica LNA output driver 706, a peak detector 708, a peak detector 710, and a comparator 712. In one implementation, the output of the splitter 154 of FIG. 1 is provided to the LNA output driver 152 and the replica LNA output driver 706. The output of the LNA output driver 152 is provided to the Bluetooth device 120 and to the peak detector 708. The output of the replica LNA output driver 706 is provided to a peak detector 710. The outputs of the peak detector 708 and the peak detector 710 are provided to a comparator 712. The comparator 712 is coupled to the WLAN communications unit 146. Additionally, a gain controller 714 controls amplification/attenuation factor of the LNA 153, the LNA output driver 152, and the replica LNA output driver 706.

In one embodiment, the replica LNA output driver 706 and the LNA output driver 152 may have similar operating characteristics. For example, the replica LNA output driver 706 and the LNA output driver 152 may comprise the same circuit connections, operate at the same operating temperature and operating voltage, may be constructed using the same technology (e.g., on an integrated circuit), etc. The gain controller 714 adjusts the gains of the LNA output driver 152 and the replica LNA output driver 706 such that the replica LNA output driver 706 has a higher gain as compared to the LNA output driver 152. The difference in the gains of the LNA output driver 152 and the replica LNA output driver 706 may be determined based on a difference between the maximum signal strength of the Bluetooth transmit signal and a maximum estimated received signal strength indicator (RSSI) of a received RF signal. Therefore, under normal operating conditions (i.e., when the Bluetooth device 120 is not transmitting) the comparator 712 may favor the output of the replica LNA output driver 708.

In some implementations, the peak detector 708 determines the signal strength of the signal at an I/O terminal of the Bluetooth device 120. As described above, the signal at the I/O terminal of the Bluetooth device 120 can be a high-power Bluetooth transmit signal when the Bluetooth device is in "transmit" mode. Alternatively, the signal at the I/O terminal of the Bluetooth device can be a portion of the received RF signal from the LNA output driver 152 when the Bluetooth device 120 is in "receive" mode. The peak detector 710 determines the signal strength of the signal input of the LNA output driver 152. This is the signal that corresponds to the portion of the received RF signal energy that is provided to the Bluetooth device 120. The comparator 712 compares the signal strengths determine by the peak detectors 708 and 710 and provides a result of the comparison to the WLAN communications controller 146. If the WLAN communications controller 146 determines that the output of the peak detector 708 is greater than the output of the peak detector 710, the WLAN communications controller 146 determines that the Bluetooth device 120 is in transmit mode. Therefore, the WLAN communications controller 146 disables the LNA output driver 152 and directs the WLAN receive circuit 144 to suspend ongoing WLAN packet reception. By disabling the LNA output driver 152, damage to the LNA output driver 152 and subsequently to other components of the WLAN device 140 can be prevented. Moreover, this can minimize corruption of the Bluetooth transmit packet.

Figure 8:
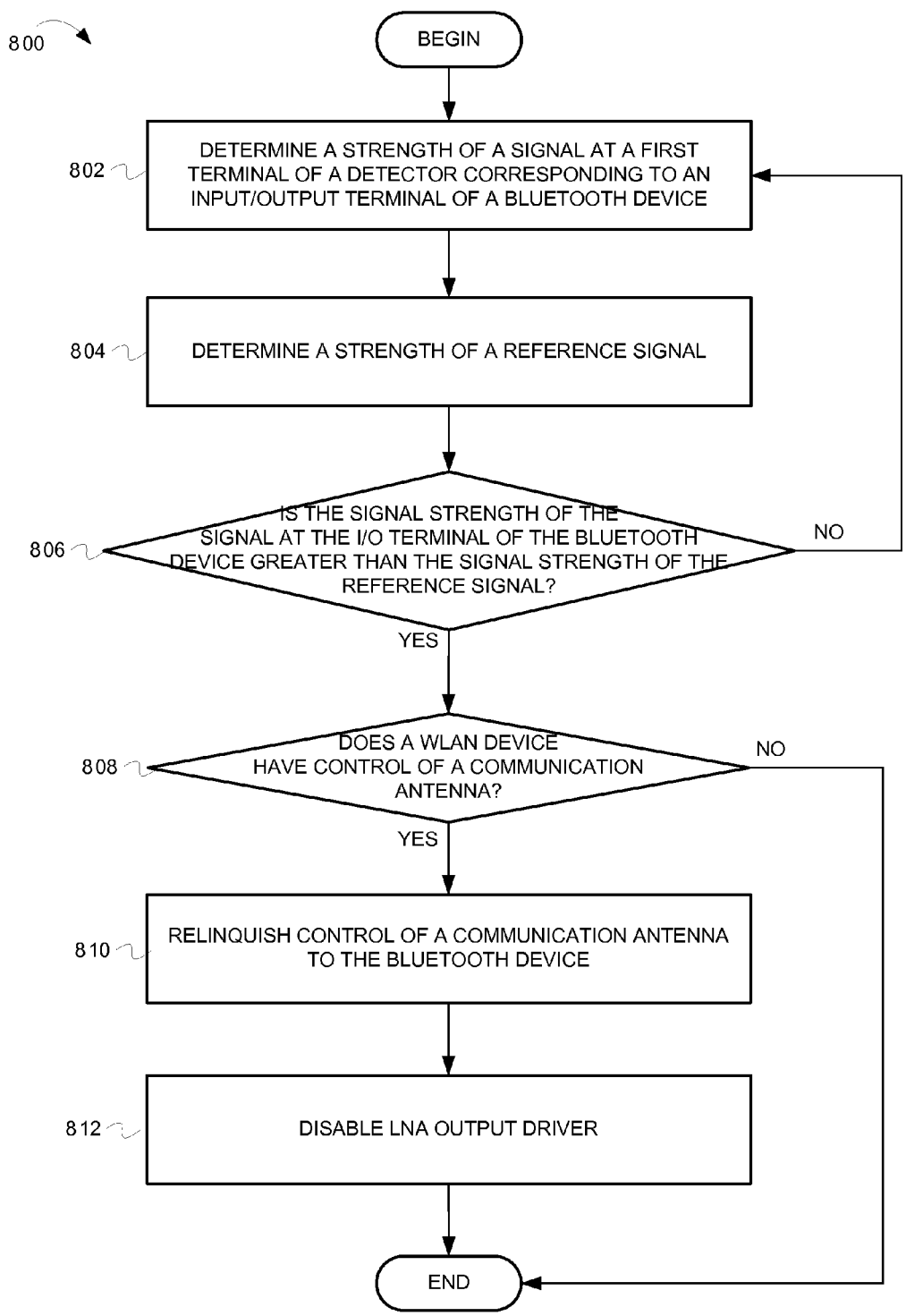
FIG. 8 is a flow diagram illustrating example operations for detecting transmission in a Bluetooth device.

FIG. 8 is a flow diagram illustrating example operations for detecting transmission in a Bluetooth device. Flow 800 begins at block 802.

At block 802, strength of a signal at a first terminal of a comparator is determined. The signal at the first terminal of the comparator corresponds to a signal at an input/output (I/O) terminal of the Bluetooth device. For instance, in the example shown in FIG. 6, the comparator 650 may determine the strength of the signal on connection 654 that connects the Bluetooth device to the comparator 650. In the example of FIG. 5, a peak detector may determine the strength of the signal at the input/output (I/O) terminal of the Bluetooth device 120. In the example of FIG. 7, the peak detector 708 may determine the strength of the signal at the I/O terminal of the Bluetooth device 120. The flow continues at block 804.

At block 804, the strength of a reference signal is determined. In one implementation, the reference signal is be a pre-determined threshold. For example, in FIG. 5, the reference signal may be the peak detector threshold. In another implementation, the reference signal may be a signal associated with the LNA output driver 152. In the example shown in FIG. 6, the reference signal is a signal at a second terminal of the comparator 650. The signal at the second terminal of the comparator 650 may correspond to a portion of a received RF signal that an LNA output driver 152 in a WLAN receive circuit 144 provides to a Bluetooth receive circuit 126. For example, the comparator 650 may determine the strength of the signal on connection 656 that connects the output of the LNA output driver 152 to the comparator 650. In the example of FIG. 7, the reference signal is a signal provided to the LNA output driver 152 and to the replica LNA output driver 706. The reference signal is a portion of the received RF signal that is provided to the Bluetooth device 120. The flow continues at block.

At block 806, it is determined whether the strength of the signal at the I/O terminal of the Bluetooth device is greater than the strength of the reference signal. For example, in FIG. 5, the peak detector can determine whether the strength of the signal at the I/O terminal of the Bluetooth device is greater than the peak detector threshold. In the example of FIG. 6, the comparator 650 may compare the strengths of the signal at the I/O terminal of the Bluetooth device and the reference signal. Communication of a collocated WLAN device 140 may be controlled depending on whether or not the strength of the signal at the I/O terminal of the Bluetooth device is greater than the strength of the reference signal. In one implementation, the comparator 650 may determine whether the strength of the signal at the I/O terminal of the Bluetooth device is greater than the strength of the reference signal by a pre-defined threshold. For example, the comparator 650 may indicate that the Bluetooth device 120 is transmitting if the strength of the signal at the I/O terminal of the Bluetooth device is at least 20% greater than the strength of the reference signal. In the example of FIG. 7, the comparator 712 may compare the signal strength at the input and the output of the LNA output driver. In other words, the comparator 712 may compare the strength of the portion of the signal to be provided to the Bluetooth device 120 and the strength of the signal at the I/O terminal of the Bluetooth device 120. If it is determined that the strength of the signal at the I/O terminal of the Bluetooth device is greater than the strength of the reference signal, the flow continues at block 808. Otherwise, the flow loops back to block 802 where the signal strength at the I/O terminal of the Bluetooth device 120 is monitored without interrupting ongoing communications of the Bluetooth device and the WLAN device 140.

At block 808, it is determined whether the WLAN device has control of a communication antenna. For example, the WLAN communications controller 146 may determine whether the WLAN device 140 is in a shared receive mode with the Bluetooth device 120, whether the WLAN device is receiving an RF signal, or whether the WLAN device 140 is transmitting a WLAN packet. If it is determined that the WLAN device 140 has control of the communication antenna, the flow continues at block 810. Otherwise, the flow ends.

At block 810, control of the communication antenna is relinquished to the Bluetooth device. For example, the WLAN communications controller 146 may suspend ongoing WLAN communications and relinquish control of the communication antenna 102 to the Bluetooth device 120. The WLAN communications controller 146 may attribute high strength of the signal at the I/O terminal of the Bluetooth device to a high-power Bluetooth transmit signal. The flow continues at block 812.

At block 812, the LNA output driver is disabled. For example, the WLAN communications controller 146 may disable the LNA output driver 152 in the WLAN receive circuit 144. This can ensure that the WLAN receive circuit 144 is not coupled with the Bluetooth device 120 and that the WLAN receive circuit 144 is not damaged by the high-power Bluetooth transmit signal. Disabling the LNA output driver 152 can also result in disabling operations of the WLAN receive circuit 144 and the Bluetooth receive circuit 126 (since no signal is provided by the LNA output driver 152 to the Bluetooth receive circuit 126). From block 812, the flow ends.

It should be understood that the depicted diagrams (FIGS. 1-8) are examples meant to aid in understanding embodiments and should not be used to limit embodiments or limit scope of the claims. Embodiments may perform additional operations, fewer operations, operations in a different order, operations in parallel, and some operations differently. For example, although FIG. 4 depicts the LNA output driver 152 being disabled (block 410) after the WLAN device 140 relinquishes control of the communication antenna 102 (block 408), in some implementations, the operations described with reference to blocks 408 and 410 may be performed concurrently. Likewise, the operations described with reference to blocks 810 and 812 may be performed in a different order or may even be performed concurrently. Furthermore, the operation described with reference to block 406 can be performed prior to the operation of block 402.

It should also be noted that the WLAN communication controller 146 might disable the LNA output driver 152 as soon as it receives an indication that the Bluetooth transmit circuit 122 will transmit a packet. In some implementations, a time instant when the WLAN communication controller 146 detects Bluetooth packet transmissions, and accordingly disables the LNA output driver 152, can influence packet collisions, integrity of the Bluetooth transmit packet, etc. For example, packet collisions and damage to the LNA output driver 152 can be avoided if the WLAN communication controller 146 detects the Bluetooth transmission prior to the ramp up stage of the Bluetooth power amplifier 176 or relatively early during the ramp up stage, when the signal strength of the Bluetooth transmit signal is not too high.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 9:
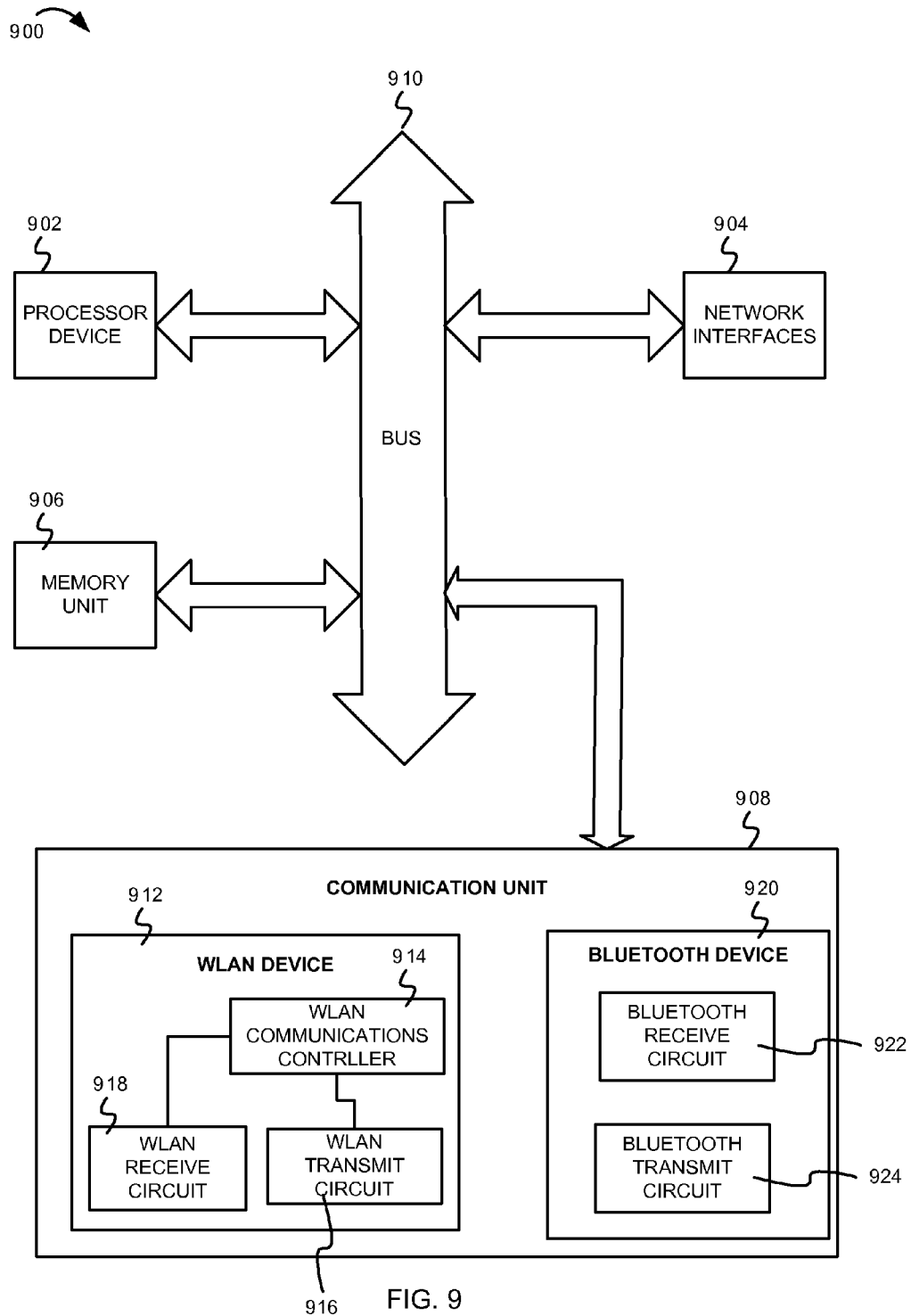
FIG. 9 is a block diagram of one embodiment of a computer system including detecting transmission in a Bluetooth device.

FIG. 9 is a block diagram of one embodiment of a computer system including detecting transmission in a Bluetooth device. In some implementations, the computer system 900 may be one of a personal computer (PC), a laptop, a netbook, a mobile phone, a personal digital assistant (PDA), or other electronic systems comprising a collocated Bluetooth device and a WLAN device. The computer system 900 includes a processor unit 902 (possibly including multiple processors, multiple cores, multiple nodes, and/or implementing multithreading, etc.). The computer system 900 includes a memory unit 906. The memory unit 906 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system 900 also includes a bus 910 (e.g., PCI, ISA, PCI-Express, HyperTransport®, InfiniBand®, NuBus, etc.), and network interfaces 904 that include at least one wireless network interface (e.g., a WLAN interface, a Bluetooth® interface, a WiMAX interface, a ZigBee® interface, a Wireless USB interface, etc.).

The computer system 900 also includes a communication unit 908. The communication unit 908 comprises a Bluetooth device 920 coupled with a WLAN device 912. The Bluetooth device 920 comprises a Bluetooth receive circuit 922 and a Bluetooth transmit circuit 924. The WLAN device 912 comprises a WLAN communications controller 914, a WLAN transmit circuit 916, and a WLAN receive circuit 918. The WLAN communications controller 914 is coupled with the WLAN transmit circuit 916 and the WLAN receive circuit 918. The WLAN communications controller 914 implements functionality to detect transmission of the Bluetooth transmit circuit and accordingly suspend operations of the WLAN receive circuit 918 as described with reference to FIGS. 1-8.

While the embodiments are described with reference to various implementations and exploitations, it will be understood that these embodiments are illustrative and that the scope of the inventive subject matter is not limited to them. In general, techniques for detecting transmission in collocated wireless devices as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
monitoring a power supply line associated with a first wireless network device of a communication system;
detecting an indication of an increase in power drawn by the first wireless network device;
determining that the first wireless network device will transmit a packet based on said detecting the indication of the increase in power drawn by the first wireless network device; and
suspending communications of a second wireless network device of the communication system in response to said determining that the first wireless network device will transmit the packet.

2. The method of claim 1, wherein said monitoring the power supply line associated with the first wireless network device of the communication system and said detecting the indication of the increase in power drawn by the first wireless network device comprises:
monitoring a power supply signaling line between the first wireless network device and a power supply associated with the first wireless network device; and
detecting, in the power supply signaling line, a request for power for a power amplifier of the first wireless network device.

3. The method of claim 1, wherein said monitoring the power supply line associated with the first wireless network device of the communication system and said detecting the indication of the increase in power drawn by the first wireless network device comprises:
monitoring voltage across a resistor coupled to the power supply line between a power supply and the first wireless network device, wherein a first terminal of the resistor is coupled to an output terminal of the power supply and a second terminal of the resistor is coupled to a power amplifier of the first wireless network device; and
detecting an increase in the voltage across the resistor.

4. The method of claim 3, wherein said detecting the increase in the voltage across the resistor further comprises:
reading a first value of the voltage across the resistor;
comparing the first value of the voltage across the resistor with a threshold voltage; and
detecting that the first value of the voltage across the resistor is greater than the threshold voltage.

5. The method of claim 1, wherein said suspending communications of the second wireless network device of the communication system further comprises at least one of suspending an ongoing reception of a receive packet associated with the second wireless network device, suspending an ongoing transmission of a transmit packet associated with the second wireless network device, and disabling a low noise amplifier output driver in the second wireless network device to isolate the second wireless network device from the first wireless network device.

6. The method of claim 1, further comprising:
transferring control of a communication antenna from the second wireless network device to the first wireless network device in response to said determining that the first wireless network device will transmit the packet.

7. The method of claim 1, wherein the first wireless network device is a Bluetooth device and the second wireless network device is a wireless local area network (WLAN) device.

8. A method comprising:
determining a signal strength of a first signal at an input/output (I/O) terminal of a first wireless network device of a communication system;
comparing the signal strength of the first signal with a signal strength of a reference signal, wherein the reference signal is a portion of a signal received by a second wireless network device of the communication system that is provided to the first wireless network device for processing by the first wireless network device;
determining that the signal strength of the first signal is greater than the signal strength of the reference signal based on determining that a difference between the signal strength of the first signal and the signal strength of the reference signal is greater than a threshold signal strength; and
suspending communications of the second wireless network device of the communication system in response to said determining that the difference between signal strength of the first signal and the signal strength of the reference signal is greater than the threshold signal strength.

9. The method of claim 8, wherein said determining that the signal strength of the first signal is greater than the signal strength of the reference signal comprises determining that the first wireless network device will transmit a packet.

10. The method of claim 8, wherein the portion of the signal received by the second wireless network device is provided to the first wireless network device via a low noise amplifier (LNA) output driver and a directional coupler, wherein an input terminal of the directional coupler is coupled to the output terminal of the LNA output driver and an output terminal of the directional coupler is coupled to the I/O terminal of the first wireless network device.

11. The method of claim 10, wherein said comparing the signal strength of the first signal with a signal strength of the reference signal further comprises comparing signal strengths of the signals at the input and the output terminals of the directional coupler.

12. The method of claim 8, wherein the portion of the signal received by the second wireless network device is provided to the first wireless network device via a low noise amplifier (LNA) output driver, wherein an output terminal of the LNA output driver is coupled to the I/O terminal of the first wireless network device and an input terminal of the LNA output driver is coupled to an input terminal of a replica LNA output driver.

13. The method of claim 12, wherein said comparing the signal strength of the first signal with a signal strength of the reference signal further comprises comparing signal strength at the output terminal of the LNA output driver and signal strength at an output terminal of the replica LNA output driver.

14. The method of claim 8, wherein the reference signal is a pre-determined threshold in a peak detector.

15. A system comprising:
a first wireless network device comprising a power supply line coupled to an external power supply; and
a second wireless network device coupled to the first wireless network device and configured to detect transmissions associated with the first wireless network device, wherein the second wireless network device comprises:
a power monitoring unit configured to:
monitor a power supply line associated with the first wireless network device;
detect an indication of an increase in power drawn by the first wireless network device;
determine that the first wireless network device will transmit a packet based on the power monitoring unit detecting the indication of the increase in power drawn by the first wireless network device; and a communication controller configured to suspend communications of the second wireless network device in response to the power monitoring unit determining that the first wireless network device will transmit the packet.

16. The system of claim 15, wherein the power monitoring unit configured to monitor the power supply line associated with the first wireless network device and detect the indication of the increase in power drawn by the first wireless network device comprises the power monitoring unit configured to:
monitor a power supply signaling line between the first wireless network device and a power supply associated with the first wireless network device; and
detect, in the power supply signaling line, a request for power for a power amplifier of the first wireless network device.

17. The system of claim 15, wherein the power monitoring unit configured to monitor the power supply line associated with the first wireless network device and detect the indication of the increase in power drawn by the first wireless network device comprises the power monitoring unit configured to:
monitor voltage across a resistor coupled to the power supply line between a power supply and the first wireless network device, wherein a first terminal of the resistor is coupled to an output terminal of the power supply and a second terminal of the resistor is coupled to a power amplifier of the first wireless network device; and
detect an increase in the voltage across the resistor.

18. The system of claim 17, wherein the power monitoring unit configured to detect the increase in the voltage across the resistor further comprises the power monitoring unit configured to:
read a first value of the voltage across the resistor;
compare the first value of the voltage across the resistor with a threshold voltage; and
detect that the first value of the voltage across the resistor is greater than the threshold voltage.

19. The system of claim 15, wherein the communication controller configured to suspend communications of the second wireless network device further comprises at least one of the communication controller configured to suspend an ongoing reception of a receive packet associated with the second wireless network device, the communication controller configured to suspend an ongoing transmission of a transmit packet associated with the second wireless network device, and the communication controller configured to disable a low noise amplifier output driver in the second wireless network device to isolate the second wireless network device from the first wireless network device.

20. The system of claim 15, further comprising the communication controller configured to:
transfer control of a communication antenna from the second wireless network device to the first wireless network device in response to said determining that the first wireless network device will transmit the packet.

21. A system comprising:
a first wireless network device configured to perform communication operations; and
a second wireless network device coupled to the first wireless network device and configured to detect transmissions associated with the first wireless network device, wherein the second wireless network device comprises:
a transmission detector configured to:
determine a signal strength of a first signal at an input/output (I/O) terminal of the first wireless network device;
compare the signal strength of the first signal with a signal strength of a reference signal, wherein the reference signal is a portion of a signal received by the second wireless network device that is provided to the first wireless network device for processing by the first wireless network device; and
determine that the signal strength of the first signal is greater than the signal strength of the reference signal based on determining that a difference between the signal strength of the first signal and the signal strength of the reference signal is greater than a threshold signal strength; and
a communication controller configured to:
suspend communications of the second wireless network device in response to the transmission detector determining that the difference between the signal strength of the first signal and the signal strength of the reference signal is greater than the threshold signal strength.

22. The system of claim 21, wherein the transmission detector is coupled to the I/O terminal of the first wireless network device and to a receive circuit of the second wireless network device.

23. The system of claim 22, wherein the receive circuit of the second wireless network device comprises a low noise amplifier (LNA) output driver, wherein the transmission detector comprises a directional coupler and comparator, wherein an input terminal of the directional coupler is coupled to an output terminal of the LNA output driver and an output terminal of the directional coupler is coupled to the I/O terminal of the first wireless network device, wherein the transmission detector configured to compare the signal strength of the first signal with the signal strength of the reference signal comprises the comparator of the transmission detector configured to compare the signal strength at I/O terminal of the first wireless network device to a signal strength at an output of the LNA output driver.

24. The system of claim 22, wherein receive circuit of the second wireless network device comprises an LNA output driver, wherein the transmission detector comprises a replica LNA output driver and a comparator, wherein an input terminal of the replica LNA output driver is coupled with an input terminal of the LNA output driver, an output terminal of the replica LNA output driver is coupled to a first input terminal of the comparator, and an output terminal of the LNA output driver is coupled to a second input terminal of the comparator and to the I/O terminal of the first wireless network device, wherein the transmission detector configured to compare the signal strength of the first signal with the signal strength of the reference signal comprises the comparator of the transmission detector configured to compare the signal strength at I/O terminal of the first wireless network device and a signal strength at the output terminal of the replica LNA output driver.

25. The method of claim 1, wherein the second wireless network device is collocated with the first wireless network device.

26. The system of claim 15, wherein the system is an integrated circuit and wherein the first wireless network device and the second wireless network device are collocated on the integrated circuit.

27. The system of claim 15, wherein the system is a circuit board, wherein the first wireless network device and the second wireless network device are collocated on the circuit board.

28. One or more non-transitory machine-readable storage media having instructions stored therein, which when executed by one or more processors causes the one or more processors to perform operations that comprise:
- monitoring a power supply line associated with a first wireless network device of a communication system;
- detecting an indication of an increase in power drawn by the first wireless network device;
- determining that the first wireless network device will transmit a packet based on said detecting the indication of the increase in power drawn by the first wireless network device; and
- suspending communications of a second wireless network device of the communication system in response to said determining that the first wireless network device will transmit the packet.

29. The machine-readable storage media of claim 28, wherein said operation of monitoring the power supply line associated with the first wireless network device of the communication system and said detecting the indication of the increase in power drawn by the first wireless network device comprises:
- monitoring voltage across a resistor coupled to the power supply line between a power supply and the first wireless network device, wherein a first terminal of the resistor is coupled to an output terminal of the power supply and a second terminal of the resistor is coupled to a power amplifier of the first wireless network device; and
- detecting an increase in the voltage across the resistor.

30. One or more non-transitory machine-readable storage media having instructions stored therein, which when executed by one or more processors causes the one or more processors to perform operations that comprise:
- determining a signal strength of a first signal at an input/output (I/O) terminal of a first wireless network device of a communication system;
- comparing the signal strength of the first signal with a signal strength of a reference signal, wherein the reference signal is a portion of a signal received by a second wireless network device of the communication system that is provided to the first wireless network device for processing by the first wireless network device;
- determining that the signal strength of the first signal is greater than the signal strength of the reference signal based on determining that a difference between the signal strength of the first signal and the signal strength of the reference signal is greater than a threshold signal strength; and
- suspending communications of the second wireless network device of the communication system in response to said determining that the difference between signal strength of the first signal and the signal strength of the reference signal is greater than the threshold signal strength.

31. The machine-readable storage media of claim 30, wherein the reference signal is a portion of a signal received by the second wireless network device that is provided to the first wireless network device for processing by the first wireless network device.

32. The machine-readable storage media of claim 31, wherein the portion of the signal received by the second wireless network device is provided to the first wireless network device via a low noise amplifier (LNA) output driver and a directional coupler, wherein an input terminal of the directional coupler is coupled to an output terminal of the LNA output driver and an output terminal of the directional coupler is coupled to the I/O terminal of the first wireless network device.

33. The machine-readable storage media of claim 31, wherein the portion of the signal received by the second wireless network device is provided to the first wireless network device via a low noise amplifier (LNA) output driver, wherein an output terminal of the LNA output driver is coupled to the I/O terminal of the first wireless network device and an input terminal of the LNA output driver is coupled to an input terminal of a replica LNA output driver.

* * * * *